US008773724B2

(12) United States Patent
Kautto et al.

(10) Patent No.: US 8,773,724 B2
(45) Date of Patent: Jul. 8, 2014

(54) METHOD OF SUPERIMPOSING AN IMAGE ONTO ANOTHER, METHOD OF PERSONALIZING A DATA CARRIER USING THE IMAGE SUPERIMPOSING METHOD AND A PERSONALIZED DATA CARRIER

(75) Inventors: Jorma Kautto, Vantaa (FI); Toni Kaskiala, Helsinki (FI)

(73) Assignee: Gemalto Oy, Vantaa (FI)

( * ) Notice: Subject to any disclaimer, the term of this patent is extended or adjusted under 35 U.S.C. 154(b) by 1522 days.

(21) Appl. No.: 12/376,924

(22) PCT Filed: Aug. 17, 2007

(86) PCT No.: PCT/EP2007/058590
§ 371 (c)(1),
(2), (4) Date: Feb. 9, 2009

(87) PCT Pub. No.: WO2008/020080
PCT Pub. Date: Feb. 21, 2008

(65) Prior Publication Data

US 2010/0165414 A1 Jul. 1, 2010

(30) Foreign Application Priority Data

Aug. 18, 2006 (EP) .................................... 06017229

(51) Int. Cl.
*G06K 15/02* (2006.01)
*G06K 9/36* (2006.01)

(52) U.S. Cl.
USPC .......... 358/3.28; 358/452; 382/100; 382/284; 382/162; 382/294; 713/176; 345/589

(58) Field of Classification Search
USPC .......................... 358/3.28; 382/100, 284, 162
See application file for complete search history.

(56) References Cited

U.S. PATENT DOCUMENTS

| | | | | |
|---|---|---|---|---|
| 4,790,566 | A | 12/1988 | Boissier et al. | |
| 7,466,876 | B2 * | 12/2008 | Alasia | 382/294 |
| 2002/0054692 | A1 * | 5/2002 | Suzuki et al. | 382/100 |
| 2002/0080995 | A1 * | 6/2002 | Rhoads | 382/100 |
| 2003/0189579 | A1 * | 10/2003 | Pope | 345/660 |

(Continued)

FOREIGN PATENT DOCUMENTS

| | | | |
|---|---|---|---|
| GB | 2 085 360 | A | 4/1982 |
| WO | WO 03//029019 | A1 | 4/2003 |

OTHER PUBLICATIONS

Form PCT/ISA/210 (International Search Report) dated Feb. 13, 2008.

(Continued)

*Primary Examiner* — Quang N Vo
(74) *Attorney, Agent, or Firm* — Buchanan Ingersoll & Rooney PC

(57) ABSTRACT

A method of superimposing a first image onto a second image, wherein each image is defined by a plurality of pixels is disclosed. The method includes changing target pixels of the second image corresponding in position to pixels of the first image to be superimposed on the second image. Changing target pixels of the second image includes changing the values of some of these target pixels of the second image to respective new values. Each new value is based on the original value of at least one pixel of the second image. A personalization method including such an image superimposing method and a data carrier thereby personalized are also disclosed.

14 Claims, 3 Drawing Sheets

(56) References Cited

U.S. PATENT DOCUMENTS

| | | | | |
|---|---|---|---|---|
| 2004/0262909 | A1 | 12/2004 | Bauer et al. | |
| 2005/0115425 | A1* | 6/2005 | Plaschka et al. | 101/170 |
| 2012/0063647 | A1* | 3/2012 | Zhao et al. | 382/112 |

OTHER PUBLICATIONS

Form PCT/ISA/237 (Written Opinion of the International Searching Authority) dated Feb. 13, 2008.

* cited by examiner

METHOD OF SUPERIMPOSING AN IMAGE ONTO ANOTHER, METHOD OF PERSONALIZING A DATA CARRIER USING THE IMAGE SUPERIMPOSING METHOD AND A PERSONALIZED DATA CARRIER

TECHNICAL FIELD

This invention relates to a method of superimposing an image onto another. More particularly, this invention relates to a method of superimposing a security pattern image onto an identification image used in a method of personalizing a data carrier so that the identification image cannot be easily falsified after personalization.

BACKGROUND

Data carriers, such as driving licenses, identity cards, membership cards, badges or passes, passports, discount cards, banking cards, money cards, multi-application cards, and other papers of value; and security documents such as bank notes are widely used. Because of the value and importance associated with each of these data carriers, they are often the subject of unauthorized copying and alterations, and forgeries.

To prevent one or more such activities from being carried out on these data carriers, different types of security features are used in the data carriers. One such security feature is to superimpose a pattern of guilloche lines onto an identification image.

Typically, superimposing a first image onto a second image involves merely replacing the pixels of the second image with respective pixels of the first image that are corresponding in position thereto. When using such a method to superimpose a set of black guilloche lines onto a black and white portrait type identification image during personalization may result in the guilloche lines not being visible in the darker portions of the identification image. This invisibility of the guilloche lines on the identification image is not acceptable since it does not allow post personalization modification of the identification image to be easily detected.

Such a problem is present in a known data carrier, wherein a pattern of guilloche lines is printed on a substrate. During personalization, the guilloche lines are printed before the portrait image. When printing the portrait image, a personalization system may either detect the location of guilloche lines or obtain information of the location of these guilloche lines stored in a memory of the personalization system. Portions of the portrait image that are determined to be overlapping these guilloche lines are removed from the portrait image or ignored and are not printed. Only the portions of the portrait image which do not overlap the guilloche lines are printed. The portrait image therefore does not overwrite the guilloche lines and is printed independently of the guilloche lines. It may therefore be possible that the guilloche lines are of the same shade as part of the portrait image and may thus not be visible in those parts of the portrait image.

Furthermore, the personalization method described above suffers from another disadvantage. Each of the guilloche lines may be laser printed to a thickness of about 100 microns. Current personalization systems are able to detect guilloche lines of such a thickness and to accurately laser print the portrait image so that it does not encroach on the guilloche lines. However, it is possible with some lasers to print lines that are thinner, in the range of between 10 to 20 microns. Thinner lines are advantageous because accurate detection of such lines may not be possible during forgery, making accurate forgery difficult. Unfortunately, it also makes it more difficult during personalization to accurately laser print the portrait image over the guilloche lines without the portrait image encroaching on the guilloche lines. More accurate and thus expensive equipment for laser printing is necessary.

It is therefore desirable to be able to superimpose a first image onto a second image so that the first image is visible thereon and using such an image superimposing method in a personalization method to personalize data carriers, enabling it to be less error prone compared to the prior art without compromising protection against forgery and manipulation.

DESCRIPTION OF THE INVENTION

According to an aspect of the invention, there is provided a method of superimposing a first image onto a second image, wherein each image is defined by a plurality of pixels. The method includes changing target pixels of the second image corresponding in position to pixels of the first image to be superimposed on the second image. For example, the first image may include a pattern on a background. Those pixels in the second image corresponding in position to pixels defining the pattern in the first image are target pixels which are to be changed. Changing these target pixels of the second image includes changing the values of some of these target pixels of the second image to respective new pixel values. Each of these new pixel values is based on the original value of at least one pixel of the second image. The values of some of the remaining target pixels may be that of the respective pixels of the first image corresponding in position thereto. Such an image superimposing method may be used in televisions, electronic displays, digital cameras, video cameras, etc for superimposing one image onto another.

The at least one pixel of the second image that is considered when changing a target pixel includes the original value of the target pixel itself and/or at least one neighbouring pixel immediately adjacent the target pixel. In other words, the new value of a target pixel may be based solely on 1) the original value of the target pixel, 2) the original value of the target pixel and the original value of one or more pixels surrounding the target pixel, or 3) the original value of one or more pixels surrounding the target pixel without considering the value of the target pixel itself.

According to some embodiments, only the original value of the target pixel is considered when changing its value. Changing the value of the target pixel in this case includes comparing the original target pixel value with a threshold value. Depending on how the original target pixel value compares with the threshold value, the target pixel value is increased or decreased by a value to obtain the new value. In this manner, a contrast is created between the modified pixel and the original pixel. As the neighbouring pixels immediately adjacent this target pixel is most likely to be similar in appearance to the original target pixel, the modified target pixel is able to stand out amongst its neighbouring pixels. That is, there is a contrast between the modified target pixel and its neighbouring pixels. Such an embodiment is advantageous because only the original value of the target pixel is considered. Therefore only limited processing is necessary to obtain the new value of the target pixel.

According to one embodiment, the value to be added to or subtracted from the original target pixel value is a predetermined value. If the original target pixel value is lower than the threshold value, the target pixel value is increased by the predetermined value. If the original target pixel value is higher than the threshold value, the target pixel value is decreased by the predetermined value. For an original target pixel having a value that is equal to the threshold value, the original target pixel value can either be increased or decreased by the predetermined value to obtain its new value.

Alternatively, the increase and decrease in the target pixel value may be by a predetermined percentage of the original target pixel value. When changed in this way, i.e. by changing the value of the original target pixel value, the first image that is superimposed on the second image has a certain tonal or colour relationship with the second image, which might make post personalization modification easier to detect.

According to another embodiment, the steps of increasing, decreasing or either increasing or decreasing the target pixel value by a predetermined value as described above is performed only if it is determined that the difference in value between the pixel of the first image and the corresponding target pixel of the second image is less than the predetermined value. That is, the predetermined value when added to or subtracted from the original target pixel value will result in a greater contrast than replacing the target pixel with the corresponding pixel of the first image. If however, it is determined that the difference in value between the pixel of the first image and the corresponding target pixel of the second image is more than the predetermined value, the value of the target pixel is set to the value of the corresponding pixel of the first image since that constitutes a greater difference in value and thus a greater contrast between the modified target pixel and the original target pixel.

According to other embodiments involving only the target pixel, changing the target pixel value includes setting the target pixel value to be the average or the sum of values of the target pixel and the first image pixel corresponding in position thereto, subject to the maximum allowable value of a pixel. The value of the target pixel may also be the sum of weighted values of the target pixel and the first image pixel. The weight for the target pixel may be different from that of the first image pixel. It is also possible that the value of the target pixel be the difference in values between the target pixel value and the corresponding first image pixel value.

According to several other embodiments, the values of two or more pixels immediately adjacent the target pixel are considered when changing the value of the target pixel. Such embodiments are advantageous because when superimposed on the second image, the appearance or contrast of the first image is enhanced. In some of these embodiments, changing the value may include comparing an average of the values of the two or more pixels of the second image with a threshold value. Depending on how the average value compares with the threshold value, the target pixel value is either increased or decreased by a value to obtain the new value. These embodiments ensure that there will be a contrast between the changed target pixel and its immediate neighbouring pixels.

According to one of these embodiments, increasing or decreasing the target pixel value by a value to obtain the new value includes increasing the target pixel value by a predetermined value if the average value is lower than the threshold value. If the average value is higher that the threshold value, the target pixel value is decreased by the predetermined value. For an average value that is equal to the threshold value, the original target pixel value can either be increased or decreased by the predetermined value to obtain its new value.

As described above for the case when only the target pixel value is considered when changing the target pixel value, the steps of increasing, decreasing or either increasing or decreasing the target pixel value is performed only if it is determined that the difference in value between the pixel of the first image and the corresponding target pixel of the second image is less than the predetermined value. Similarly, if it is determined that the difference in value between the pixel of the first image and the corresponding target pixel of the second image is more than the predetermined value, the value of the target pixel is set to the value of the corresponding pixel of the first image.

According to another one of the embodiments wherein two or more pixel values of the second image is used to determine the value of the target pixel, the value of the target pixel is changed to a value that is at least a predetermined value away from each of the values of the two or more pixels of the second image, where possible. For example if there are three grayscale pixels having brightness values of 35, 150 and 200 respectively for an 8-bit representation, the new value of the target pixel may be 240, which is at least 40 away from the values of each of the three pixels. If the values of these three pixels are 35, 150 and 230 for example, the new value of the target pixel may be 190, which is 40 away from 150 and 230. The predetermined value may be set depending on the number of pixel values of the second image that is used. For example, when all eight neighbouring pixels are taken into consideration, the worst-case values for these eight pixels are 0, 35, 70, 105, 140, 175, 210, 255. In this case, the new value of the target pixel may be the value between any pair of the values, i.e. 17, 43, 87, 122, etc. That is, the predetermined value will be at least 17, which is 1/15 of the maximum value of a pixel, and the new value of the target pixel will then be at least this predetermined value away from each of the eight neighbouring pixels. Similarly, when four neighbouring pixels are considered, the predetermined value will be at least 32, which is 1/8 of the maximum value. In this manner, the new value of the target pixel will bear a certain tonal or colour relationship with its neighbouring pixels. Alternatively, the new value of the target pixel is set to a median of the values of the two or more pixels of the second image. For a colour pixel, it may also be possible to set the value of the target pixel to a greatest possible distance away from each of the values of the two or more pixels of the second image.

For all the embodiments described above, the first and the second image may be in black and white, monochrome or colour. In other words, the pixels of the first and the second image may be defined in grayscale or in colour. For a colour pixel, at least one of the values of the lightness and colour components may be changed.

A colour pixel may be represented in a colorimetric format, such as the Commission Internationale de l'Eclairage LAB (CIEL) format, the 3 channel RGB format, or other colour formats. When represented in the CIEL format, the value of one or more subcomponents of brightness, hue and saturation of the lightness component of a pixel may be changed in any manner as described above. Alternatively or additionally, it is also possible for any of the values of the colour components to be changed to make the security pattern vivid, for example by turning the pixel value into a colour that complements that of surrounding pixels. If colour balance of the changed identification image is important when only the lightness component is changed, the personalization method may further include converting the format of the combined image to a 3-channel RGB format. Doing so would maintain the original colour balance of the combined image. And if the pixels are represented in the 3-channel RGB format, one of the colour channels of a pixel may be changed as described above. Alternatively, two or all three of the colour channels may be changed. Applying the method to all three channels of the 3-channel RGB format pixels will result in a minor change in colour balance for pixels representing graphics.

According to another aspect of the invention, there is provided a software program that is executable by a computing device for superimposing a first image onto a second image. The software program includes instructions for executing steps according to the method described above.

According to another aspect of the invention, there is provided a program storage device readable by a computing device, tangibly embodying a program of instructions, executable by the computing device to perform the method for superimposing a first image onto a second image as described above.

According to yet another aspect of the invention, there is provided a method of personalizing a data carrier. The personalization method includes realizing a security pattern image and an identification image at the data carrier. This method is characterized in that the method comprises superimposing the security pattern image onto the identification image according to the method described above, with the security pattern image as the first image and the identification image as the second image. Accordingly, realizing the security pattern image and realizing the identification image includes printing a combined image including the identification image with the security pattern image superimposed thereon. In this manner, only a single set of data is used for printing. It should be noted that the second image is not limited to an identification image. The second image may be any image that is non-identification related, such as an advertising image.

According to most embodiments, the data carrier is one of a batch of data carriers, and in that a different identification image is used for personalizing each data carrier in the batch. Similarly, the non-identification image may change from one data carrier to another.

Printing may include laser printing, laser engraving, laser inducing, ink jet printing, dye sublimation printing, thermo-transferring, and other known printing methods. Such a personalization method takes less time to complete since detection of the location of pre-printed guilloche lines required in the prior art is no longer necessary. Equipment change or upgrade in the personalization system is also not necessary if the printing resolution is high enough to print the combined image; only a software change is necessary. Moreover, the thickness of lines in the security pattern may be reduced to that printable with the resolution of the personalization system, allowing very thin lines to be printed. Thin lines make post personalization falsifying of the identification image more difficult to be successful. And since the identification image and the security image are combined and printed in a single pass, the risk of overwriting of the security pattern is eliminated. The identification image may include a portrait image, a logo, or text showing a rank, department, etc. The security pattern image may include a pattern of guilloche lines, a digital stamp, a logo, a signature, text showing a birthday, social security number, name, etc. of a person. Ink jet printing may involve printing the entire second image first, followed by printing over target pixels with pixels of the new values. In other words, changing the values of some of these target pixels of the second image to respective new values involves printing over the original target pixels of the second image.

According to yet a further aspect of the invention, there is provided a data carrier. The data carrier includes an identification image and a security pattern image printed thereat, the identification image being congruent with the security pattern image. That is, the security pattern image is of at least substantially the same size and aspect ratio as the identification image and at least partially overlaps the identification image. The data carrier is characterized in that the security pattern image is defined by two or more pixels, the values of at least some of which are at least substantially based on the values of neighbouring pixels of the identification image to be in contrast therewith. In other words, each of these pixels has an appearance that bears a relationship to respective neighbouring pixels of the identification pixel. For example, in a black and white identification image having a white portion and a black portion. According to the methods for superimposing an image described above, a security pattern image overlapping the white portion may be light gray and the security pattern image overlapping the black portion may be dark gray. Thus, the security pattern image superimposed on the identification image is dependent on and therefore bears a relationship with the identification image. Where there is a change in appearance of the identification image, for example between the white portion and the black portion, there is also a similar change in the security pattern image, between light gray and dark gray in this example. In other words, the security pattern image includes different portions, each of which is defined by one or more pixels having at least substantially the same value. However, the value of the one or more pixels changes from one portion to another in accordance with the values of pixels of the identification image immediately adjacent thereto. In this manner, the appearance of the security pattern image is enhanced against the identification image to create an optimized contrast therebetween.

Other aspects and advantages of the invention will become apparent from the following detailed description, taken in conjunction with the accompanying drawings, illustrating by way of example the principles of the invention.

BRIEF DESCRIPTION OF DRAWINGS

The invention will be better understood with reference to the drawings, in which.

DETAILED DESCRIPTION OF THE EMBODIMENTS

Figure 1:
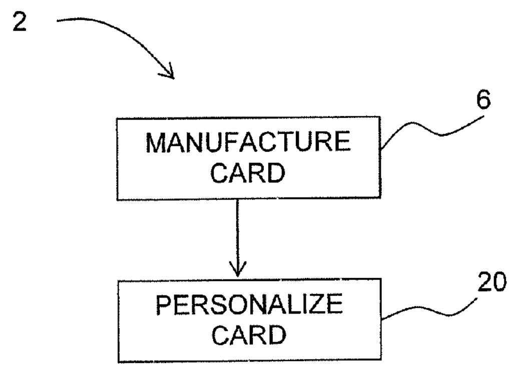
FIG. 1 is a flow diagram showing a sequence of steps for producing an identity card type data carrier, the sequence including a manufacturing step and a personalizing step.

As shown in the drawings for purposes of illustration, the invention is embodied in a method of personalizing a data carrier and a data carrier produced using the method. The method, according to an embodiment of the invention, includes printing a security pattern image and an identification image at a layer of the data carrier. The security pattern and identification image are defined as respective image data. The identification image is congruent with the security pattern. Prior to printing at the layer, data representative of the security pattern image and the identification image are digitally combined by superimposing the security pattern image on the identification image to produce a combined image data. The combined image data is then used for printing the identification image with the security pattern image superimposed thereon at the layer.

Hereafter, an embodiment of the present invention will be described in the context of an identity (ID) card type data carrier and a method for personalizing it. However, it is to be understood that the invention is applicable to any data carrier that needs personalizing with an identification image that is congruent with a security pattern using any known printing method. Such a data carrier includes, but is not limited to, a driving license, a badge or pass, a passport datapage, a discount card, a membership card, a banking card, a credit card, a money card, a multi-application card, a bank note and other security documents and papers of value that are to be provided with information or data in such a way that they are protected from attempted manipulation and preferably also cannot be easily imitated by common means. In an identity card, the identification image may be a portrait image and the security pattern image may be a set of guilloche lines.

Figure 2:
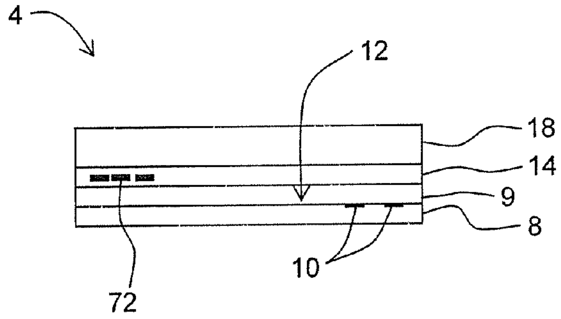
FIG. 2 is a cross sectional drawing of an ID card produced using the sequence in FIG. 1, the ID card including a laser-sensitive layer.

FIG. 1 shows a main sequence 2 of steps for manufacturing and personalizing an identity (ID) card 4. The main sequence 2 starts with a MANUFACTURE CARD step 6, wherein the ID card 4 is manufactured according to any known card manufacturing process. FIG. 2 shows a manufactured ID card 4. The manufactured ID card 4 includes a substrate 8 fabricated of plastic film materials customary in card application, such as polycarbonate. Non-personalized information 10 is printed on a surface 12 of the substrate 8. This non-personalized information 10 may include, but not limited to, a serial number and a national emblem. A feature carrier layer 9 is fixedly attached to the substrate 8 for carrying other non-personalized information or security features (not shown). Detachment of this feature carrier layer 9 after it has been fixedly attached to the substrate 8 will preferably damage the printed information 10 on the substrate 8. A laser-sensitive layer 14 is fixedly attached to the feature carrier layer 9 using for example adhesive, thermal bonding, ultra-sonic bonding or the like. This laser-sensitive layer 14 may be fabricated of clear polycarbonate with carbon particles therein for creating a black and white image. Other materials may be used so long as they are able to absorb the energy of a laser beam for creating a marking thereat. Some of these materials include those in which colour images can be laser printed or induced.

A laminating sheet 18, acting as a protective layer, is laminated to the laser-sensitive layer 14, to protect the laser-sensitive layer 14, the feature carrier layer 9 and the substrate 8 from environmental influences, mechanical damage and abrasion, or alteration. The laminating sheet 18 is fabricated of clear polycarbonate. A layer of adhesive (not shown) may be used between the laminating sheet 18 and the laser-sensitive layer 14 to fixedly attach the two layers 14, 18 to each other, especially where lamination is not possible. The attachment of the two layers 14, 18 preferably render the laminating sheet 18 undetachable from the laser-sensitive layer 14. Additional adhesive layers (not shown), in particular hot melt adhesive layers, can optionally be provided for attaching the individual layers 8, 9, 14, 18.

The thermal properties of the substrate 8, the feature carrier layer 9, the laser-sensitive layer 14 and the laminating sheet 18 are selected such that only the laser-sensitive layer 14 is affected by a selected laser without the substrate 8, the feature carrier layer 9 and the laminating sheet 18 being irreversibly destroyed.

Figure 8:
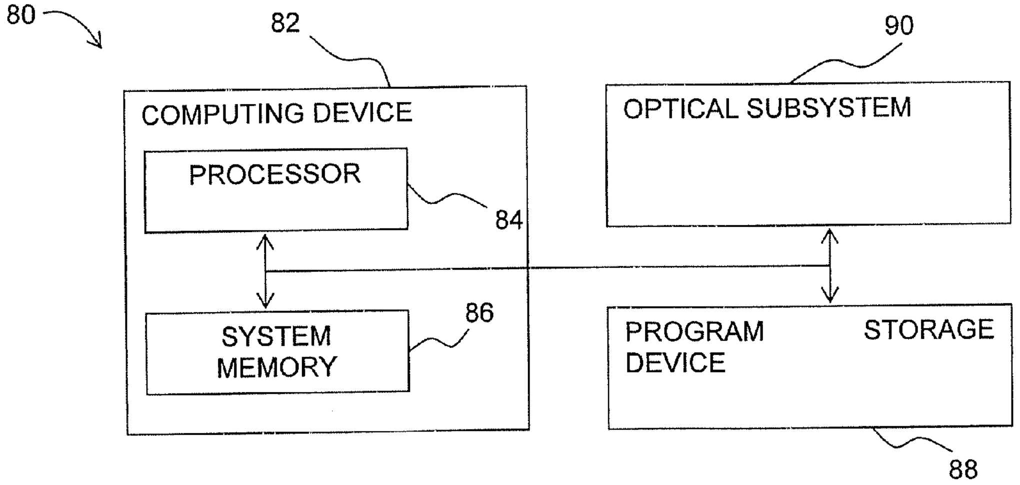
FIG. 8 is block diagram of a computing subsystem for performing the steps for superimposing the guilloche lines onto the portrait image.
Figure 3:
FIG. 3 is a drawing of a portrait image for laser printing at the laser-sensitive layer of the ID card in FIG. 2.
Figure 4:
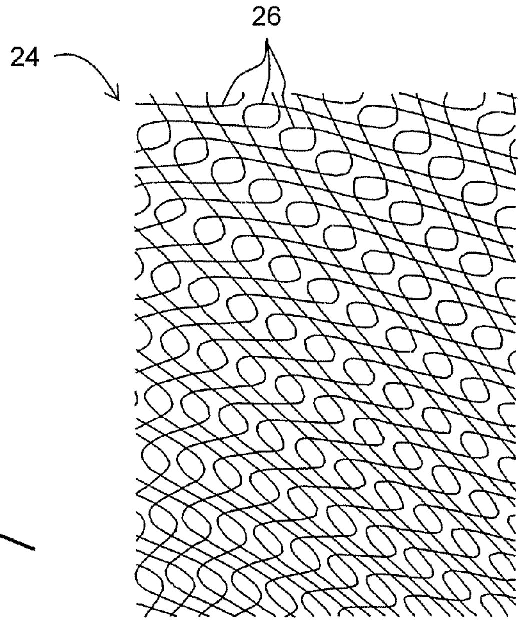
FIG. 4 is a drawing of a pattern of guilloche lines for laser printing at the laser-sensitive layer of the ID card in FIG. 2.

The sequence 2 next proceeds to a PERSONALIZE CARD step 20 for creating personalized markings, such as a portrait image 22 and a security pattern 24 of guilloche lines 26 shown in FIGS. 3 and 4 respectively, at the laser-sensitive layer 14. The personalization sequence 20 is carried out using a personalization system 80 as shown in FIG. 8. The personalization system includes a computing device 82 having a programmable processor 84 and a system memory 86; a program storage device 88 that is readable by the computing device; and an optical subsystem 90 that is controllable by the computing device 82. One or more computer programs (not shown) that implement the personalization sequence 30 are stored in program storage device 88. The processor 84 reads and executes the one or more computer programs to perform the personalization sequence 30. Each of the computer programs may be implemented in any desired computer programming language (including machine, assembly, high level procedural, or object oriented programming languages). In any case, the language may be a compiled or interpreted language.

Data defining the pixels of the portrait image 22 and the guilloche lines 26 are stored in respective JPEG files of the same size, in terms of the number of pixels, and with the same aspect ratio, in the system memory 86. The files may be in other formats, such as but not limited to, bitmap and Portable Network Graphics (PNG) formats. The portrait image 22 may be a black and white "token image" according to International Civil Aviation Organization (ICAO) standard, having a size of 480 by 640 pixels. The portrait image file (not shown) may be obtained by scanning a photograph or obtained directly from the person to whom the ID card 4 will be issued. Each pixel of the portrait image 22 has a grayscale value ranging from 0-255 for an 8-bit representation, with 0 representing white, 255 representing black and the values in between representing different shades of gray. The guilloche lines 26 are software generated using suitable mathematical equations. The line thickness, density and pattern may be selected to suit the portrait image 22. This pattern 24 of guilloche lines 26 is kept secret at a personalization centre. It is preferable that the same pattern 24 be used for personalizing different ID cards although it is possible to have a different pattern for each ID card.

Figure 5:
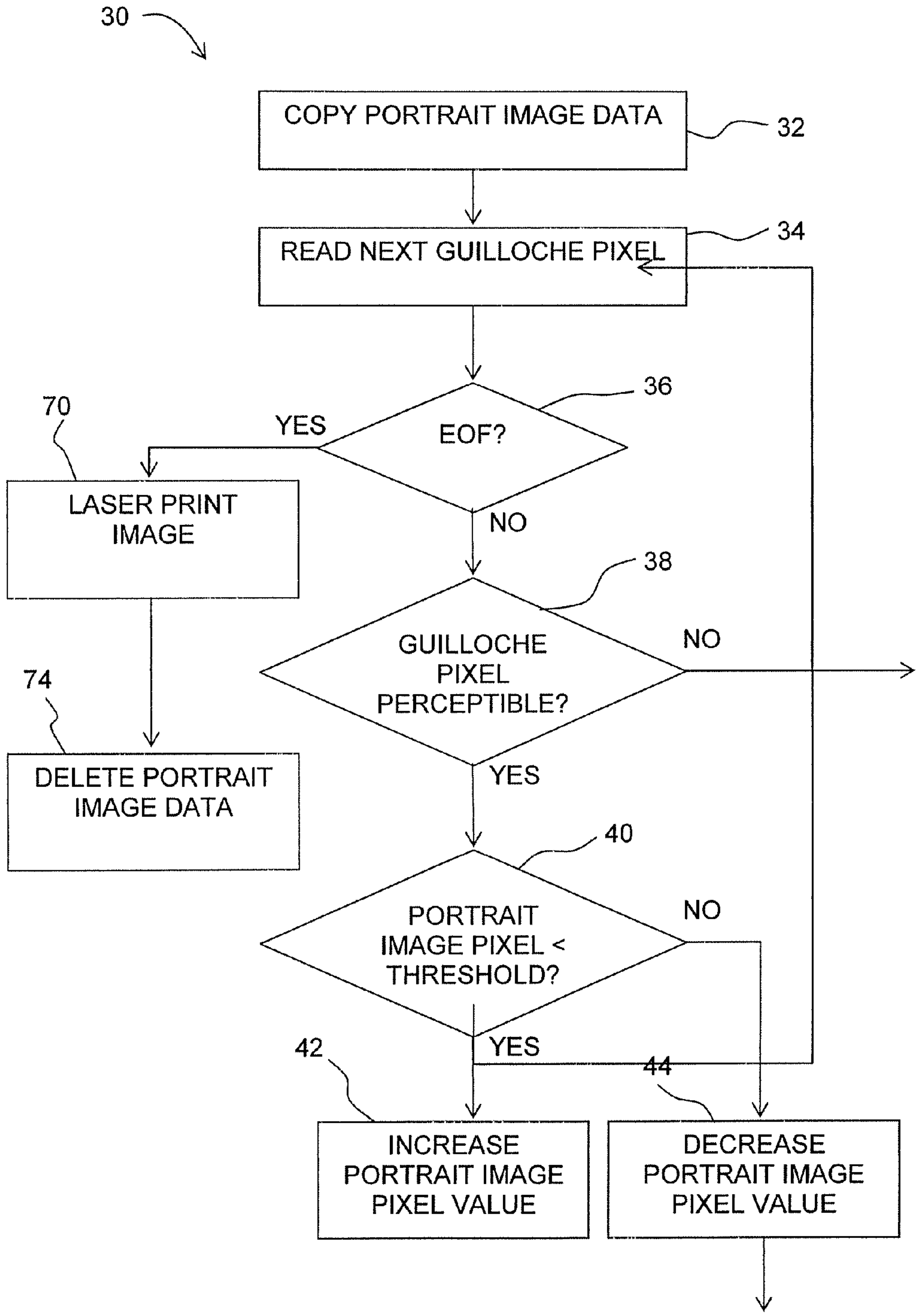
FIG. 5 is a flow diagram showing a sequence of steps in the personalizing step in FIG. 1, the sequence including steps for superimposing the guilloche lines in FIG. 4 onto the portrait image in FIG. 3.

For each pixel in the portrait image file, there is a corresponding pixel in the guilloche lines image file. FIG. 5 shows the details of the PERSONALIZE CARD step 20 according to the embodiment of the invention. The PERSONALIZE CARD step 20 includes a PERSONALIZE CARD sequence 30 of sub steps. The PERSONALIZE CARD sequence 30 starts in a COPY PORTRAIT IMAGE DATA step 32, wherein the processor 84 copies the portrait image data from the JPEG file to another file in the system memory 86 of the personalization system 80 to result in a copy 33 of the portrait image. The PERSONALIZE CARD sequence 30 next proceeds to a READ NEXT GUILLOCHE PIXEL step 34, wherein the processor 84 reads a next pixel from the guilloche lines image file. The sequence 30 next proceeds to an EOF? decision step 36, wherein the processor 84 determines if the end-of-file of the guilloche lines image file has been reached. If it is determined in this decision step 36 that the end-of-file has not been reached, the PERSONALIZE CARD sequence 30 next proceeds to a GUILLOCHE PIXEL PERCEPTIBLE? decision step 38. In this decision step 38, the processor 84 determines if the read guilloche pixel is visually perceptible to either the naked eye or under a suitable optical device. For example, the grayscale value may be compared to the value zero or any other suitable value to determine if the pixel is visually perceptible. In the pattern 24, pixels defining the guilloche lines 26 have a value that is greater than zero while pixels defining the white background portions have a value of zero. If the value of the read guilloche pixel is equal to zero, the pixel is determined to be not visually perceptible. In such a case, the sequence 30 returns to the READ NEXT GUILLOCHE PIXEL step 34 to read a next guilloche pixel. If the value of the read guilloche pixel is not equal to zero, the read guilloche pixel is determined to be visually perceptible. In such a case, the PERSONALIZE CARD sequence 30 proceeds to a PORTRAIT IMAGE PIXEL<THRESHOLD? decision step 40 to start superimposing the guilloche pixel onto the copy 33 of the portrait image. In this step 40, the processor 84 compares the value of the target portrait pixel, corresponding in position to the read guilloche pixel, to a threshold value. If it is determined that the target portrait image pixel value is less than the threshold value, the sequence 30 proceeds to an INCREASE PORTRAIT IMAGE PIXEL VALUE step 42, wherein the value of the target portrait image pixel value in the memory is increased by a predetermined value. However, if the target portrait image pixel value is equal to or above the threshold value, the sequence 30 proceeds to a DECREASE PORTRAIT IMAGE PIXEL VALUE step 44, wherein the target portrait image pixel value in memory is decreased by the predetermined value. The predetermined value may be fixed at a single value regardless of the target portrait image pixel value. For example, this predetermined value may be fixed at a value in the range between 10 and 127. Alternatively, the predetermined value may be dependent on the target portrait image pixel value. For example, the predetermined value may be 127 if the target portrait image pixel defines a white background or black area which has a value of 0 or 255 respectively. And the predetermined value may be less, such as 50 if the target portrait image pixel has a value of for example 30. The value by which the target portrait image value should be increased or decreased should not be so large as to disrupt the portrait image 22 to a point that it is no longer recognizable. The value should, however, also not be too small such that there is little or no perceptible change to the portrait image 22. If this is the case, post personalization falsification may be easily carried out without it being detectable. From the INCREASE PORTRAIT IMAGE PIXEL VALUE step 42 and the DECREASE PORTRAIT IMAGE PIXEL VALUE step 44, the sequence 30 returns to the READ NEXT GUILLOCHE PIXEL step 34.

Figure 6:
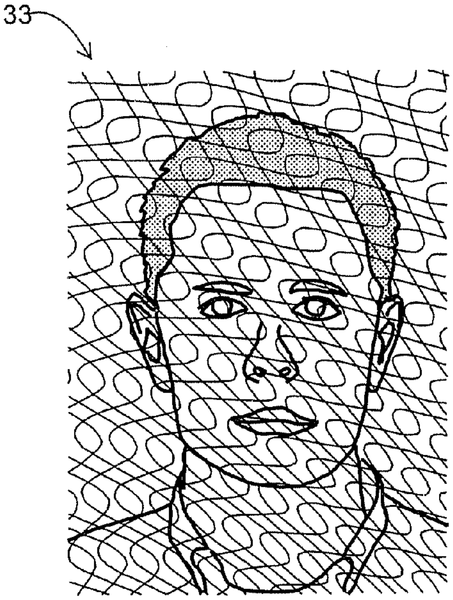
FIG. 6 is a drawing of a combined image that includes the portrait image in FIG. 3 that is changed to include an image of the guilloche lines in FIG. 4.
Figure 7:
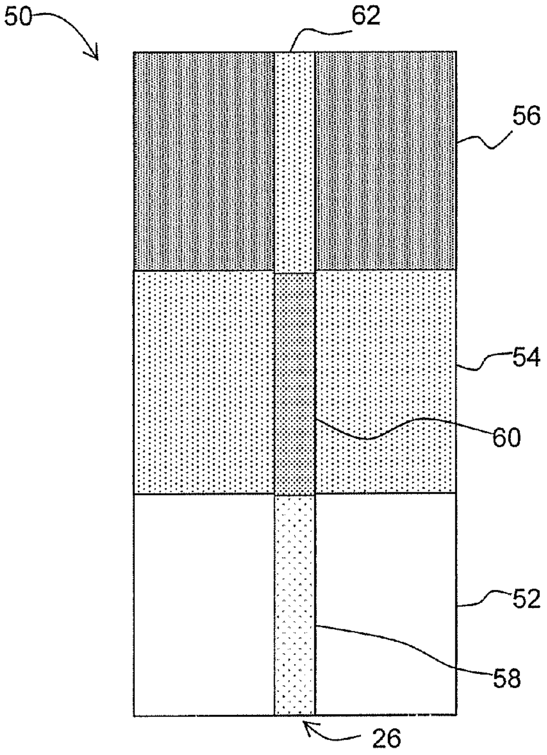
FIG. 7 is a drawing showing an illustrative part of the portrait image in FIG. 3 that is changed to include the image of a guilloche line.

The processor 84 repeats the steps 34-44 until the end of the guilloche lines image file is reached. With the change in portrait image pixels as described above, the portrait image 33 in the system memory 86 is modified with portions thereof being different from the original portrait image 22 and the guilloche lines 26. These portions of the portrait image 33 in memory are modified to increase their contrast with other portions of the portrait image 33 that do not correspond to visually perceptible portions of the guilloche lines 26. The modifying of the portrait image 33 in this manner results in the guilloche lines 26 being applied to or superimposed on the portrait image 33 in the memory, and the modified portrait image 33 is now a combined image of the portrait and the guilloche lines. In this manner, the guilloche lines pattern is superimposed on the portrait image. The values of pixels defining the guilloche lines in the combined image are based on the respective original values of the portrait image. That is, the guilloche lines image is used only as a template in this particular embodiment. FIG. 6 shows the modified portrait image 33 in the memory. As it is not possible to fully show how the original portrait image 22 is changed, the guilloche lines 26 in FIG. 4 is merely shown in FIG. 6 as simply replacing the portions of the portrait image 22 corresponding in position thereto. However, it should be noted that such is not the case in the combined image obtained according to the abovementioned embodiment of the invention. FIG. 7 is another illustration that more accurately shows the changes to the original portrait image 22. FIG. 7 shows an enlarged part 50 of an illustrative portrait image 33 in memory having a white region 52, a gray region 54, and a black region 56 and a guilloche line 26 running through the regions 52-56. According to the above described embodiment, a portion 58, 60, 62 of each of the regions 52-56 overlapping with the guilloche line 26 is changed to contrast it with the neighbouring portions which do not overlap the guilloche line 26 but visually non-perceptible portions of the pattern 24. The values of the pixels representing these portions 58, 60, 62 are changed according to the above described method such that they have a tonal or colour relationship with their neighbouring portions to create a contrast therebetween. In the combined image, the values of the guilloche lines image pixels are thus at least substantially based on the values of neighbouring pixels of the portrait image and in contrast therewith. After it has been determined at the EOF? decision step 36 that the end-of-file has been reached, the PERSONALIZE CARD sequence 30 ends in a LASER PRINT IMAGE step 70, wherein the computing device uses data of the portrait image 33 in the system memory to control the optical sub system to generate, guide and focus a laser beam (not shown) thereof through the laminating sheet 18 of the ID card 4 to print a corresponding image 72 at the laser-sensitive layer 14. For this laser-sensitive layer 14 having carbon particles therein, the carbon particles absorb the photons from the laser beam and burn the material surrounding them, turning the material black. This blackening of the material may be on the surface of the laser-sensitive layer 14 or within the volume of the laser-sensitive layer 14. Alternatively in other embodiments, the laser-sensitive layer 14 may contain pigments, reagents or known component sensitive to the laser light. For these other laser-sensitive layers, the laser beam will cause reactions with these pigments, reagents or known components to form the combined image at the laser-sensitive layer 14. After the image 72 is printed, the PERSONALIZE sequence 30 ends in a DELETE PORTRAIT IMAGE DATA step 74, wherein the processor erases the data of the portrait image 33 from the system memory.

Although the present invention is described as implemented in the above-described embodiment, it is not to be construed to be limited as such. Other materials, for example, papers or plastic materials of different surface nature, such as photographic papers, passport datapages, documents, value-bearing papers, banknotes, checks, etc. may also be used as the substrate.

As another example, the substrate need not be a separate layer but can be integral with the laser-sensitive layer In such a case, the substrate is a self-supporting laser sensitive layer, which preferably, is fabricated of plastic and can be sensitized by the admixture of small quantities of substances that are strongly absorbent for the wavelength of the laser beam.

As yet another example, the non-personalized information and data that are described to be printed on the substrate may also be laser printed together with the personalized image at the laser-sensitive layer. The non-personalized information and data may also include company logos, insignias of rank, etc. The personalized information and data may also include a fingerprint and an iris scan image. Furthermore, the security features, which include different kinds of security printing, threads, holograms, etc., are not necessarily restricted to being on the feature carrier layer. These security features may be scattered, where possible, in the different layers of the data carrier.

As yet another example, the laser sensitive layer may also be a transparent sheet of coating including pigments or organic compounds sensitive to the laser or made up of several superimposed layers of different coloured pigments.

As yet a further example, the laser-sensitive layer 14 may also include a layer of varnish that is applied to the surface of the feature carrier layer 9 in a surface treatment process to render the surface sensitive to laser.

Generally speaking, if the change of the values of some of the target pixels of the second image to respective new values, may represent at least 1/15 of maximum scale value for grayscale. In some cases, considering others scales of values (wavelength scale for colored pixels, brightness scale . . . ), the change value may bring a specific difference between changed pixel and target pixel of the image (or closest neighbouring pixel). This difference may represent at least ½ or ⅕, or 1/10 or 1/15 of the total scale extend, depending namely how many different pixel tones or colors are used in the image and/or pattern. As a proportional rule, when "n" different tones are involved in the image and are regularly spread (with same gap spacing each other) in a scale of values, the specific greater difference brought by the invention method between changed pixel and targeted pixel (or closest neighbouring pixel of the image close to the targeted pixel) may equal or be always greater than 1/n of the value scale extend.

The invention claimed is:

1. A method of superimposing a first image onto a second image for creating a target image, wherein the first image, the second image, and the target image each are defined by a plurality of pixels, each pixel being associated with a pixel value, the method comprising:

changing a pixel value of the target image to be equal to a pixel value of the second image if the corresponding pixel value of the first image is equal to zero;

changing the pixel value of the target image to be equal to the pixel value of the first image if the corresponding pixel value of the first image is not equal to zero, wherein for each pixel of the target image corresponding to a pixel of the first image, a contrast evaluation is performed between the corresponding pixel of the first image and a neighboring pixel of the second image, and the pixel value of the target image is increased or decreased based on the evaluation result in order to obtain a visible contrast between the first and second image in all parts of the target image.

2. A method according to claim 1, wherein the contrast evaluation is made by comparing the corresponding pixel value of the second image with a threshold value, and changing the pixel value of the target image comprises:

increasing or decreasing the pixel value of the target image by a value to obtain a new value, depending on the comparison with the threshold value.

3. A method according to claim 2, wherein increasing or decreasing the pixel value of the target image by a value to obtain the new value comprises:

increasing the pixel value of the target image by a predetermined value if the corresponding pixel value of the second image is lower than the threshold value;

decreasing the pixel value of the target image by the predetermined value if the corresponding pixel value of the second image is higher than the threshold value; and either increasing or decreasing the pixel value of the target image if the pixel value of the second image is equal to the threshold value.

4. A method according to claim 1, wherein the contrast evaluation is made by making the difference of corresponding pixel values between the pixel of the first image and the corresponding pixel of the second image; and wherein the increasing or decreasing of the pixel value of the target image is made if the result of the difference is lower than a predetermined threshold value.

5. A method according to claim 1, wherein the contrast evaluation is made by:

comparing an average of the values of the plurality of pixels of the second image with a threshold value; and increasing or decreasing the pixel value of the target image by a value to obtain a new value, depending on how the average value compares with the threshold value.

6. A method according to claim 5, wherein increasing or decreasing the pixel value of the target image by a value to obtain the new value comprises:

increasing the pixel value of the target image by a predetermined value if the average value is lower than the threshold value;

decreasing the pixel value of the target image by the predetermined value if the average value is higher that the threshold value; and either increasing or decreasing the pixel value of the target image if the average value is equal to the threshold value.

7. A method according to claim 5, wherein the pixel value of at least one pixel of the target image is based on the values of a plurality of pixels of the second image, and increasing or decreasing the pixel value of the target image to a new value comprises:

where possible, setting the new pixel value of the target image to a value that is a predetermined value away or a greatest possible distance away from each of the values of the plurality of pixels of the second image;

otherwise, setting the new pixel value of the target image to a median of the values of the plurality of pixel values of the second image, a minimum value of a pixel or a maximum value of a pixel.

8. A method according to claim 5, wherein the pixel value of at least one pixel of the target image is based on the values of a plurality of pixels of the second image, and increasing or decreasing the pixel value of the target image to a new value comprises:

setting the pixel value of the target image to a value that is a greatest possible distance away from each of the values of the plurality of pixels of the second image.

9. A method according to claim 1, wherein the pixel value comprises a grayscale value for a black and white second image, or at least one of the values of the lightness and colour components for a coloured second image.

10. A method of personalizing a data carrier comprising:

realizing a security pattern image at the data carrier;

realizing an identification image at the data carrier;

superimposing, by a processor, the security pattern image onto the identification image according to claim 1; and making the security pattern image and making the identification image by printing, by a printer, the identification image with the security pattern image superimposed on the data carrier.

11. A method of personalizing a data carrier according to claim 10, wherein the data carrier is one of a batch of data carriers, and wherein a different identification image is used for personalizing each data carrier in the batch.

12. A method of personalizing a data carrier according to claim 10 wherein printing comprises one of laser printing, laser engraving, dye sublimation printing and ink jet printing.

13. A data carrier comprising:

a target image printed thereon, said target image comprising an identification image and a security pattern image at least partially overlapping each other, wherein the identification image and the security pattern image are each defined by a plurality of pixels, and each pixel of the security pattern image bears a tonal or color relationship to its respective at least one neighboring pixel of the identification image, and the tonal or color relationship comprises at least a predetermined difference between the security pattern image pixel value and its respective at least one neighboring identification image pixel value, said predetermined difference being representative of a minimal contrast.

14. A data carrier according to claim 13, wherein the predetermined value is at least 1/15 of the maximum value of a pixel.

* * * * *